United States Patent [19]

Wood

[11] Patent Number: 5,219,806
[45] Date of Patent: Jun. 15, 1993

[54] ALPHA PHASE SEEDING OF TRANSITION ALUMINA USING CHROMIUM OXIDE-BASED NUCLEATING AGENTS

[75] Inventor: Thomas E. Wood, Maplewood, Minn.

[73] Assignee: Minnesota Mining and Manufacturing Company, St. Paul, Minn.

[21] Appl. No.: 552,489

[22] Filed: Jul. 16, 1990

[51] Int. Cl.$^5$ ............................................. C04B 35/10
[52] U.S. Cl. .................... 501/127; 501/132; 501/153; 51/309
[58] Field of Search .............. 501/127, 132, 153; 51/309

[56] References Cited

U.S. PATENT DOCUMENTS

| B 502,773 | 1/1976 | Sowman | 106/57 |
|---|---|---|---|
| 3,108,888 | 10/1963 | Bugosh | 106/62 |
| 3,491,491 | 1/1970 | Ueltz | 51/309 |
| 3,491,492 | 1/1970 | Ueltz | 51/309 |
| 3,615,308 | 10/1971 | Amero | 51/309 |
| 3,717,497 | 2/1973 | Stradley et al. | 117/169 |
| 3,808,015 | 4/1974 | Seufert | 106/65 |
| 3,853,688 | 12/1974 | D'Ambrosio | 161/178 |
| 4,007,020 | 2/1977 | Church et al. | 51/295 |
| 4,019,914 | 4/1977 | Esper et al. | 106/62 |
| 4,101,615 | 7/1978 | Horikiri et al. | 264/63 |
| 4,125,406 | 11/1978 | Sowman | 106/57 |
| 4,217,113 | 8/1980 | Suh | 51/309 |
| 4,252,544 | 12/1981 | Takahashi | 51/309 |
| 4,574,003 | 3/1986 | Gerk | 51/309 |
| 4,623,364 | 11/1986 | Cottringer et al. | 51/309 |
| 4,657,754 | 4/1987 | Bauer | 423/625 |
| 4,744,802 | 5/1988 | Schwabel | 51/309 |
| 4,770,671 | 9/1988 | Monroe et al. | 51/293 |
| 4,797,139 | 1/1989 | Bauer | 51/293 |
| 4,829,031 | 5/1989 | Roy et al. | 501/134 |
| 4,881,951 | 11/1989 | Wood et al. | 51/309 |
| 4,964,883 | 10/1990 | Morris et al. | 51/293 |
| 5,009,676 | 4/1991 | Rue et al. | 51/309 |

FOREIGN PATENT DOCUMENTS

| 0293163 | 11/1980 | European Pat. Off. |
| 0291029 | 11/1988 | European Pat. Off. |
| 0294208 | 12/1988 | European Pat. Off. |
| WO90/02160 | 3/1990 | PCT Int'l Appl. |
| 2099012 | 5/1982 | United Kingdom |
| 2094288 | 9/1982 | United Kingdom |

OTHER PUBLICATIONS

"Enhanced Densification of Boehmite Sol-Gels by Alpha Alumina Seeding", Kumagai et al., *Communications of the American Ceramic Society*, Nov., 1984, C-230-31.

"Microstructural Evolution in Sintering of ALOOH Gels", Yarbrough et al., *J. Mater. Res.*, 3, (4), 1987, pp. 494-515.

"Enhancing densification of 93% $Al_2O_3$-7% MgO triphasic xerogels with crystalline $\alpha$-$Al_2O_3$ and $MgAl_2O_4$ seeds", Komarneni et al., *J. Mater. Sci. Lett.*, 6, 1987, pp. 525-527.

"Sapphire Whiskers From Boehmite Gel Seeded With $\alpha$-Alumina", Jagota et al, *J. Cryst. Growth*, 85, 1987, pp. 527-534.

"Ceramics by the Solution-Sol-Gel Route", Roy, *Science*, 238, Dec. 18, 1987, pp. 1664-1669.

"Solid-Phase Epitaxy of Boehmite-Derived $\alpha$-Alumina on Hematite Seed Crystals", McArdle et al, *J. Am. Ceramic Soc.*, 72, (5), 1989, pp. 864-867.

"Nucleation of alpha alumina in boehmite gel", Pach et al., *J. Mater. Res.*, 5, (2), Feb. 2, 1990, pp. 278-285.

"Effects of Metallic Oxides on $\alpha$-Transformation of Alumina", Wakao et al., *Nagoya Kogyo Gijutsu Shikeusho Hokoko* II, 11, (9), Sep. 1962, pp. 588-595.

(List continued on next page.)

*Primary Examiner*—Mark L. Bell
*Attorney, Agent, or Firm*—Gary L. Griswold; Walter N. Kirn; Gregory D. Allen

[57] ABSTRACT

This invention provides an improved alpha alumina-based ceramic and a method to make the same. The improvement consists of the addition of a chromium-based nucleating agent. Particularly useful embodiments of the improved alpha alumina-based ceramic include abrasive particles and fibers.

48 Claims, No Drawings

OTHER PUBLICATIONS

"Influence of Cr and Fe on Formation of $\alpha$-$Al_2O_3$ from $\gamma$-$Al_2O_3$", *J. Am. Ceram. Soc.*, 57, (8), 1974, pp. 367–371, (Bye et al.).

"The Effect of $Cr^{3+}$ and $Fe^{3+}$ Ions on the Transformation of Different Aluminum Hydroxides to $\alpha$-$Al_2O_3$", Tsuchida et al., *Thermochim. Acta.*, 64, 1983, pp. 337–353.

"Transformation and Microstructure Control in Boehmite-derived Alumina by Ferric Oxide Seeding", *Adv. Cer. Matls.*, 3, (4), 1988, pp. 387–392 (McArdle et al).

"Alpha Alumina Formation in $Al_2O_3$ Gels", Dynys et al., *Ultrastructure Processing of Ceramics, Glasses, and Composites*, Ch. 11, Hench et al., ed., 1984.

"Lowering the Sintering Temperature and Enhancing Densification by Epitaxy in Structurally diphasic $Al_2O_3$ and $Al_2O_3$-MgO Xerogels", Suwa et al., *Matl. Sci. Eng.*, 83, 1986, pp. 151–159.

"Controlled Transformation and Sintering of a Boehmite Sol-Gel by $\alpha$-Alumina Seeding", Kumagi et al., *J. Am. Ceram. Soc.*, 68, (9), 1985, pp. 500–505.

"Low-Temperature Sintering of Aluminum Oxide", Yeh et al., *J. Am. Ceram. Soc.*, 71, (10), 1988, pp. 841–844.

"Controlled Chemical Nucleation of Alpha Alumina Transformation", Messing et al., *Science of Ceramics* 14, Taylor, ed., 1988, pp. 101–106.

"Lowering Crystallization Temperatures by Seeding in Structurally Diphasic $Al_2O_3$-MgO Xerogels", Suwa et al., *J. Am. Ceram. Soc.*, 68, (9), 1985, pp. C238–C240.

"Fine Particulates to Ultrafine-Grain Ceramics", Vasilos et al., *Ultrafine-Grain Ceramics, Proc. of 15th Sagamore Army Mat. Res. Conf.*, Ch. 8, 1970, pp. 156–157 and 165–166.

"Study on Alumina as Raw Materials for Artificial Gems (Thermal Decomposition Process of Alums)", Okada et al., *J. Ind. Chem.*, 59(11), 1956, pp. 1301 (71)–04 (74).

"Effect of Sintering Atmosphere on Densification of MgO-Doped $Al_2O_3$", Paek et al *J. Am. Ceram. Soc.*, 71, (8), 1988, pp. C-380–C-382.

"Nucleation and Epitaxial Growth In Diphasis (Crystalline & Amorphous) Gels", Roy et al, publication information unknown.

"A Novel Combustion Process For The Synthesis of Fine Particle $\alpha$-Alumina and Related Oxide Materials", *Mat. Lett.*, 6(11,12), Jul., 1988, pp. 427–432.

E. Ryshkewitch, *Oxide Ceramic*, Academic Press, New York, 1960, pp. 193–195.

ALPHA PHASE SEEDING OF TRANSITION ALUMINA USING CHROMIUM OXIDE-BASED NUCLEATING AGENTS

FIELD OF INVENTION

This invention provides an alpha alumina-based ceramic article seeded with a chromium-based nucleating agent. In another aspect, this invention relates to a method for preparing an alpha alumina-based ceramic by alpha phase seeding transition alumina using a chromium oxide-based nucleating agent.

BACKGROUND OF THE INVENTION

The preparation of dense alumina-based ceramic articles via a sol-gel process comprising an alpha alumina or alpha ferric oxide nucleating material is known in the art. For example, M. Kumagai and G. L. Messing spoke at the American Ceramic Society meeting of May 2, 1984 on this subject and later caused the publishing of a paper in November, 1984 in *Communications of the American Ceramic Society* entitled "Enhanced Densification of Boehmite Sol-Gels by Alpha Alumina Seeding". Other references on this subject include the following publications: "Microstructural Evolution in Sintering of ALOOH Gels", by Yarbrough et al., *J. Mater. Res.*,(4), 1987, pp. 494–515; "Enhancing Densification of 93% $Al_2O_3$- 7% MgO Triphasic Zerogels with Crystalline α-$Al_2O_3$ and $MgAl_2O_4$ Seeds," Komareni et al., *J. Mater. Sci. Lett.*, 6, 1987, pp. 525–27; "Sapphire Whiskers From Boehmite Gel Seeded with from α-Alumina, "Jagota et al., 85, 1987, pp. 527–34; "Ceramics By The Solution-Sol-Gel Route", Roy, *Science*, 238, Dec. 18, 1987, pp. 1664–69; "Solid-Phase Epitaxy of Boehmite-Derived from Alumina on Hematite Seed Crystals," Messing et al., *J. Am. Ceramic Soc.*, 72, (5), 1989, pp. 864–67; "Nucleation of Alpha Alumina in Boehmite Gel," Pach et al., *J. Mater. Res.*, 5, (2), Feb. 2, 1990, pp. 278–85; U.S. Pat. Nos. 4,744,802 (Schwabel), 4,770,671 (Monroe), 4,623,364 (Cottringer et al.), 4,829,031 (Roy et al.), and 4,797,139 (Bauer), and European Patent Application Nos. 0293163 (Wood), published Dec. 7, 1988; and 0294208 (Wood et al.), published Nov. 30, 1988.

Although both Monroe and Cottringer et al. disclose the use of chromium oxide as a modifying additive in a sol-gel derived alpha alumina-based ceramic, they neither suggest nor teach its use as a nucleating agent.

Although Schwabel indicates that materials crystallographically similar to alpha alumina, in addition to alpha ferric oxide, are contemplated as alpha alumina nucleating agents, he neither specifies the use of alpha chromic oxide nor teaches the use of alpha chromic oxide as a nucleating agent. Further, he discloses the use of chromium oxide as a modifying additive, but does not suggest its use as a nucleating agent.

Several of the publications cited above suggest the use of chromium oxide ($Cr_2O_3$) as a nucleating agent for the growth of alpha alumina from boehmite. None of these publications, however, disclose a method for the effective use of such a chromium-based seed or nucleating agent. For example, Bauer suggests the use of chromium oxide ($Cr_2O_3$) as a nucleating agent for the growth of alpha alumina crystals from boehmite under appropriate conditions, he fails, however, to disclose or suggest such conditions. Roy et al. attempted to use $Cr_2O_3$ as a nucleating agent and concluded that a $Cr_2O_3$ seed has "hardly any" on the alpha alumina transformation temperature, because it appears that such a seed needs to exactly match the alpha alumina lattice.

Yarbrough et al. attempted to seed an alpha alumina precursor by introducing a high purity chromia powder into a xerogel. Diffuse reflectance infrared spectra of the calcined gel suggests that the oxidation state of all or all but a small amount of the chromium was +6, not +3. Further, the authors concluded that alpha $Cr_2O_3$ does not increase nucleation frequency as much as might be expected. This article includes a photomicrograph of their best example which, reveals domains having an average diameter of about 3 micrometers. No density data were reported.

Wood et al. teach the use of an amorphous iron containing oxy-hydroxy polymer as a nucleating material for the alpha transformation in basic aluminum salt derived aluminas. Although the inventors disclose that nucleating materials prepared by the cohydrolysis of iron and chromium salts can be as effective at nucleating the alpha alumina transformation in basic aluminum salt derived alumina as the hydrous iron complex they do not teach or suggest the use of alpha chromic oxide ($Cr_2O_3$) as an alpha phase nucleating agent.

SUMMARY OF THE INVENTION

The present invention provides alpha alumina-based ceramic having a seeded microstructure comprising alpha alumina domains nucleated with alpha chromic oxide. Preferably, the alpha alumina-based ceramic has a well-seeded microstructure. More preferably, the average diameter of the alpha alumina domains is less than about 0.5 micrometer, and most preferably their average diameter is less than about 0.25 micrometer. Preferably, the ceramic has a chromium content, derived from alpha chromic oxide, in the range of about 0.085 to about 7 weight percent, based on the amount of alpha alumina present. More preferably, chromium present in the range of about 0.3 to about 3.5 weight percent, even more preferably, it is present in the range of about 0.7 to about 2.75 weight percent, and most preferably, it is present in the range of about 1 to about 2.4 weight percent.

The terms "seed" and "nucleate" are used herein interchangeably to refer to the providing of multiple externally introduced alpha alumina crystal growth sites. The term "domain" as used herein refers to an identifiable, generally equiaxed region comprised of alpha alumina microcrystallites or a single alpha alumina microcrystallite, wherein the lattices of the alpha alumina microcrystallites are similarly oriented.

The term "nucleating agent" as used herein refers to an externally introduced alpha phase crystal growth site. The term "nucleating material" as used herein refers to a nucleating agent or a precursor thereof.

The term "well-seeded microstructure" as used herein refers to a ceramic, which after sintering, comprises domains of less than about 1 micrometer average diameter nucleated with a nucleating agent, and having a density of greater than 95 percent of theoretical, wherein substantially all porosity is located at the microcrystallite boundaries or triple points. The term "seeded microstructure" as used herein refers to a ceramic, which after sintering, comprises domains of less than about 2 micrometers average diameter nucleated with a nucleating agent, and having a density of greater than 90 percent of theoretical, wherein substantially all porosity is located at the microcrystallite boundaries or triple points. The term "non-seeded microstructure" as used herein refers to a ceramic, which after sintering, comprises domains of greater than about 2 micrometers average diameter or a density of less than 90 percent theoretical, wherein the microstructure may be further characterized as being vermicular or wormy.

The term "aqueous mixture" as used herein refers to a dispersion-based sol, a solution-based sol, or the like. The term "immobilize" as used herein refers to either gelling the dispersion-based sol or rigidifying the solution-based sol.

In another aspect, this invention provides methods for making an alpha alumina-based ceramic, comprising the steps of:

a) preparing an aqueous mixture (e.g., a dispersion or a solution) comprising:
   i) an alpha alumina precursor; and
   ii) a sufficient amount to nucleate during the following process steps said alpha alumina precursor to alpha alumina having a seeded microstructure, of at least one compound selected from the group consisting of an alpha chromic oxide precursor, alpha chromic oxide, and mixtures thereof;
b) immobilizing the aqueous mixture;
c) drying the immobilized aqueous mixture to produce a dry body;
d) calcining the body at a temperature and in an atmosphere sufficient to provide substantially all the chromium derived from the compound within the body in an oxidation state of not greater than +3; and
e) sintering said calcined body at a temperature and in an atmosphere sufficient to provide an alpha alumina-based ceramic having a seeded microstructure.

Two important aspects of the present invention not taught in the art are the preferred particle size of the nucleating material and the preferred oxidation state of the nucleating material during the making of the alpha alumina-based ceramic. Preferably, the particle size of the nucleating material is generally less than about 0.5 micrometer.

The oxidation state of the alpha chromic oxide ($Cr_2O_3$) nucleating agent of the present invention is +3. Except for when the nucleating material is acting as an alpha phase crystal growth site (i.e. as a nucleating agent), the preferred oxidation state of the chromium comprising the nucleating material may not necessarily be +3. For example, it is thought that the dispersibility of the inventive nucleating material in the sol is enhanced if at least some of the surface chromium comprising the nucleating material is in an oxidation state higher than +3, but lower than +6. The more preferred oxidation state of the surface chromium comprising the chromium-based nucleating material introduced into the sol is believed to be +4.

Preferably, substantially all the chromium comprising the nucleating material during calcining is converted to or maintained in an oxidation state of not greater than +3. Further, it is thought that during sintering substantially all the chromium should have an oxidation state of not greater than +3.

The method of the present invention teaches means for providing the nucleating material in the desired oxidation state during processing. For example, during calcining the oxidation state of the chromium may be controlled by the presence of internal reducing materials (e.g., organic material), the calcining atmosphere, or combinations thereof. During sintering, the oxidation state of the chromium may be controlled by the sintering atmosphere.

Particularly useful embodiments include abrasive grain (sometimes referred to as abrasive particles) and fibers. Abrasive grain according to the present invention exhibit increased grinding performance over a comparable ceramic without nucleating sites. Preferred abrasive products comprising the abrasive grain include coated, bonded, and low density, three-dimensional products. The preferred fiber according to the present invention is flexible and has an average surface roughness of less than 0.100 micrometer. Such fibers are useful in the manufacture of woven refractory products such as fabric, batting, mats, roving, and thread. These fibers are also useful as a reinforcement and as a toughening phase in composites, such as ceramic composites or metal-matrix composites.

Chromium-based nucleating materials useful in the present invention are disclosed in assignee's copending patent application Ser. No. 07/552,891, now U.S. Pat. No. 5,139,978, filed the same date as this application.

The art teaches neither the alpha alumina-based ceramic of the present invention, nor a method to make the same.

DETAILED DESCRIPTION OF THE PREFERRED EMBODIMENTS

Alpha phase nucleating agents useful in preparing the ceramic of the present invention are crystallographically similar to alpha alumina and include alpha chromic oxide. The presence of the nucleating material during the thermal processing of the sol gel results in a ceramic material which has smaller domains and a higher density than the ceramic without the nucleating material, producing a more durable ceramic. The nucleating agent is thought to provide a growth site for alpha alumina.

Chromium-based alpha phase nucleating materials useful in the present invention include alpha chromic oxide or a precursor thereof, such as $CrO_2$ or $HCrO_2$. Surprisingly, the most preferred nucleating material is $CrO_2$, wherein the chromium is in the +4 oxidation state. The amount of chromium-based nucleating material useful in the present invention can vary considerably. Preferably, the sintered ceramic comprises in the range of about 0.085 to about 7 percent by chromium, based on the amount of alpha alumina present, although amounts outside of this range are also thought to be useful.

The particle size of the alpha chromic oxide or alpha chromic oxide precursor nucleating material which is useful in the practice of the present invention may vary considerably. Preferably, the chromium-based nucleating material has an average particle size of less than about 0.5 micrometer in the primary dimension, wherein the primary dimension is the largest measurement of length of a particle where the line of length runs though the center of the particle. More preferably, the average particle size is less than about 0.25 micrometer, and most preferably it is less than about 0.1 micrometer.

The particle size distribution of the nucleating material is thought to be less important than the size of the particles, although coarse particles which would tend to settle from the dispersion are preferably removed. Preferably, the chromium-based nucleating material should either remain in the alpha form during thermal processing or convert to alpha chromic oxide at a temperature below the temperature at which aluminum oxide monohydrate would transform to alpha alumina.

Useful chromium-based nucleating materials are commercially available. For example, alpha chromic oxide is available from CMC Cometals, Inc., New York, N.Y. $HCrO_2$ may be prepared by techniques known in the art including, for example, autoclaving a chromium salt solution, such as chromium nitrate or chromium chloride. $CrO_2$ may be prepared by thermally decomposing $CrO_2$, as described in U.S. Pat. No. 3,117,093, the disclosure of which is incorporated herein by reference.

The particle size of the nucleating material may be reduced using techniques known in the art, including, for example, ball milling, jet milling, and the like.

Preferably, the surface of the chromium-based nucleating material is hydrated. By hydrated it is meant that the surface of the particle has reacted with water to form surface hydroxyl groups. Generally, the degree of surface hydration may be increased by exposing chromia to moisture or by aging it in water over a period of time (e.g., several hours to several months). It is believed that hydration of the surface of the nucleating material enhances its dispersibility in a sol as well as promotes the interaction of the nucleating material with the alpha alumina precursor.

Although not wanting to be bound by theory, it is believed that it may be desirable for the surface of the chromium-based nucleating material as added to the sol to have at least some of the chromium in an oxidation state higher than +3, but lower than +6. The more preferred oxidation state of the surface chromium is believed to be +4. It is thought that chromium in the +3 oxidation state is inert and may not hydrate as rapidly or interact as readily with the alumina precursor as chromium in other oxidation states. It is also thought that raising the oxidation state of the surface chromium may change the electro-kinetic properties of the chromium-based nucleating material. Such a change in the electro-kinetic properties may enhance the interaction between the chromium-based nucleating material and the alumina precursor. For example, at a pH of about 3 to 4, boehmite particles are positively charged, whereas $CrO_2$ particles are negatively charged.

Chromium on the surface of alpha chromic oxide particles may be raised to a higher oxidation state by techniques known in the art including comminution in the presence of an aqueous solution containing an oxidizing agent, such as chromic acid, nitric acid, atmospheric oxygen, the like, or combinations thereof.

In a preferred method, the ceramic of the present invention is prepared by a sol-gel process, wherein at least one chromium-based nucleating material is added to an aqueous mixture comprising an alumina precursor. More preferably, the ceramic of the present invention is prepared using a dispersion-based sol-gel process, wherein the alpha alumina precursor is preferably aluminum oxide monohydrate (boehmite) or a solution-based sol-gel process, wherein the alpha alumina precursor is preferably an aluminum carboxylate or an aluminum nitrate.

A process utilizing a mixture of the dispersion-based sol and the solution-based sol may also be useful in preparing the ceramic of the present invention.

A PREFERRED DISPERSION-BASED SOL-GEL PROCESS

A sol-gel process containing boehmite as the alpha alumina precursor usually begins with the preparation of a dispersion comprising from about 2 to almost 60 weight percent aluminum oxide monohydrate in the boehmite crystalline form. The boehmite can either be prepared from various techniques well known in the art or can be acquired commercially from any of a number of suppliers. For example, boehmite is commercially available under the trade designation "DISPERAL" from Condea Chemie, GMBH or "CATAPAL D" from Vista Chemical Company. These aluminum oxide monohydrates are in the boehmite form, are relatively pure (including relatively little, if any, hydrate phases other than monohydrates), and have a high surface area. The physical properties of the final fired product will generally depend upon the type of alumina monohydrate chosen for the dispersion.

Preferably, the chromium-based nucleating material is added to the dispersion as an aqueous slurry.

The dispersion may also contain a modifying additive or a precursor thereof which can be added to enhance some desirable property of the finished product or increase the effectiveness of the sintering step. These additives are generally in the form of colloidal particles or soluble salts (typically water soluble) and typically consist of a metal-containing oxide or a precursor of a metal oxide, wherein preferably the metal is selected from the group consisting of magnesium, zinc, cobalt, nickel, zirconium, hafnium, yttrium, scandium, gadolinium, silicon, lanthanum, praseodymium, cerium, dysprosium, neodynium, samarium, ytterbium, erbium and titanium. The exact proportions of these components that are present in the dispersion can vary to convenience.

A peptizing agent is usually added to the boehmite dispersion to produce a more stable hydrosol or colloidal dispersion. Monoprotic acids or acid compounds which may be used as the peptizing agent include acetic, hydrochloric, formic, and nitric acid. Although nitric acid is a preferred peptizing agent, it is preferable to minimize the amount of nitric acid used. The thermal degradation of nitric acid can generate $NO_2$ which can oxidize and affect the oxidation state of the chromium comprising the chromium-based nucleating material. Multiprotic acids are normally avoided since they rapidly gel the dispersion making it difficult to handle or mix in additional components. Some commercial sources of boehmite contain an acid titer (such as absorbed formic or nitric acid) to assist in forming a stable dispersion.

Organic additives which are easily oxidized, such as sugars, starches, organic polymers, and the like may be added to the dispersion to inhibit oxidation of the chromium-based nucleating material.

The dispersion can be formed by any suitable means which may simply be the mixing of aluminum oxide monohydrate with water containing a peptizing agent or by forming an aluminum oxide monohydrate slurry to which the peptizing acid is added. Once the dispersion is formed, it preferably is then immobilized. The immobilized dispersion or gel can be formed by any conventional technique such as the addition of a dissolved or dispersed metal containing modifying additive, e.g., magnesium nitrate or zirconium nitrate, the addition of a salt such as ammonium acetate or ammonium nitrate, the removal of water from the dispersion, or some combination of such techniques.

Once the gel has formed, it may be shaped by any convenient method such as pressing, molding or extrusion and then carefully dried to produce an uncracked body of the desired shape.

If an abrasive material is desired, the gel can be extruded or simply spread out to any convenient shape and dried, typically at a temperature below the frothing temperature of the gel. Any of several dewatering methods, including solvent extraction, can be used to remove the free water of the gel to form a solid. Preferably, the gel is dried by heating in a forced air convection oven with an air temperature between about 70 and about 99° C.

After the solid is dried, it can be cut or machined to form a desired shape or crushed or broken by an suitable means, such as a hammer, roll crusher, or ball mill, to form particles. Any method for comminuting the solid can be used and the term "crushing" is used, to include all such methods.

After shaping, the dried gel can then be calcined to remove essentially all volatiles and transform the various components of the dried gel into ceramics (metal oxides). Preferably, the dried gel is calcined by heating to a temperature in the range of about 400° to about 1000° C. and held within this temperature range until the free water and over 90 weight percent of any bound water is removed. Preferably, the calcining atmosphere should be such that substantially all the chromium derived from the chromium-based nucleating material is in an oxidation state not greater than +3.

If an internal reducing material such as a sugar, a starch, an organic polymer, or the like is present, the dried gel may be calcined in air or in a mixture of air and an inert gas (i.e., argon, nitrogen, helium, carbon dioxide, the like, or mixtures thereof).

In the absence of such an internal reducing material, the calcining atmosphere preferably comprises an inert gas. More preferably, the calcining atmosphere comprises an inert gas and a reducing gas (i.e., hydrogen, carbon monoxide, the like, or mixtures thereof), and most preferably, it comprises a reducing gas.

The calcined material is then sintered by heating to a temperature of between about 1200° and about 1650° C. and held within this temperature range until substantially all of the alpha alumina precursor is converted to alpha alumina. More preferably, the sintering temperature is in the range from between about 1300° and about 1450° C., and most preferably, it is between about 1350° and about 1450° C. The length of time to which the ceramic must be exposed to the sintering temperature to achieve this level of conversion will depend upon various factors but usually from about 1 to about 60 minutes is sufficient.

The sintering atmosphere is such that substantially all the chromium comprising the nucleating agent is in an oxidation state of not greater than +3. It is believed, although not confirmed, that having a relatively small amount of the chromium in the +2 oxidation state may enhance the sintering process.

The preferred sintering atmosphere is dependent on the amount of nucleating material present, or more specifically on the chromium content of the calcined body. For a calcined body comprising more than about 0.7 weight percent chromium, based on the alumina content of the calcined body, the preferred sintering atmosphere comprises an inert gas. More preferably, the sintering atmosphere comprises an inert gas and a reducing gas, and most preferably it comprises a reducing gas.

For a calcined body comprising less than about 0.7 weight percent chromium, the preferred sintering atmosphere comprises a gas selected from the group consisting of air, inert gas, reducing gas, and compatible mixtures thereof.

Other steps can be included in this process, such as rapidly heating the material from the calcining temperature to the sintering temperature, sizing granular material, centrifuging the dispersion to remove sludge waste, etc. Moreover, this process can be modified by combining two or more of the individually described steps, if desired.

It is within the scope of this invention to use other nucleating materials known in the art, including alumina, ferric oxide, and ferric oxide precursors, provided such nucleating materials are not added in an amount sufficient to allow conversion to an alpha alumina-based ceramic having a seeded or well-seeded microstructure, in the absence of the nucleating material of the present invention.

These process steps and materials are more fully described in U.S. Pat. Nos. 4,314,827 and 4,744,802, the disclosures of which are incorporated herein by reference.

A PREFERRED SOLUTION-BASED SOL-GEL PROCESS

A solution-based sol can be prepared by techniques known in the art. Typical preparation techniques include dissolving an alumina-based salt or complex in water; or diluting or concentrating a solution comprising an alumina-based salt or complex. Preferably, the solution-based sol comprises in the range of about 5 to 45 weight percent of an alpha alumina precursor.

Preferably, the solution-based sol-gel comprises a soluble aluminum salt or other soluble aluminum-based complex. More preferably, the solution-based sol-gel comprises at least one of the following alpha alumina precursors: a basic aluminum carboxylate, a basic aluminum nitrate, and a partially hydrolyzed aluminum alkoxide.

Preferred solution-based sols include those comprising basic aluminum salts with carboxylate or nitrate counterions or mixtures thereof.

The preferred aluminum carboxylates are represented by the general formula,

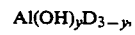

$$Al(OH)_y D_{3-y},$$

wherein y can range from between about 1 and about 2, preferably between about 1 and about 1.5, and D (the carboxylate counterion) is formate, acetate, propionate, oxalate, the like, and combinations thereof. Aluminum carboxylates can be prepared by techniques known in the art including the methods described in U.S. Pat. No. 3,957,598 (the disclosure of which is incorporated herein by reference), wherein aluminum metal is digested in a carboxylic acid solution and U.S. Pat. No. 4,798,814 (the disclosure of which is incorporated herein by reference), wherein aluminum metal is dissolved in a hot aqueous solution comprising formic acid and acetic acid.

The preferred basic aluminum nitrates are represented by the general formula, $Al(OH)_z(NO_3)_{3-z}$, wherein Z can range from about 0.5 to about 2.5. The preparation of basic aluminum nitrates is known in the art and includes the methods taught in U.S. Pat. No. 3,340,205 and British Patent No. 1,139,258 (the disclosures of which are incorporated herein by reference), wherein aluminum metal is digested in a nitric acid solution. Basic aluminum nitrates may also be prepared according to U.S. Pat. No. 2,127,504 (the disclosure of which is incorporated herein by reference), wherein aluminum nitrate is thermally decomposed.

Preferably, the chromium-based nucleating material is added to the solution as an aqueous slurry.

Modifying additives as well as organic additives as described in the preferred dispersion-based sol-gel process may be added to the solution-based sol. For example, organic additives such as, sugars, starches, organic polymers, or hydroxy organic polymer acids may be admixed with the sol comprising the basic aluminum nitrate to facilitate removal of the nitrate during calcining.

The solution-based sol may be immobilized (or rigidified) by any conventional technique including dehydrative rigidification. The immobilized sol may be dried by known techniques including those described above for drying a gelled dispersion-based sol.

An abrasive material or other shaped article may be prepared as described above in the preferred dispersion-based sol-gel process.

In a preferred method for forming a fiber, the solution-based sol generally contains about 5 to about 20 weight percent equivalent oxide solids. The weight percent equivalent oxide solids can be determined, for example, by calcination. The sol is then concentrated or viscosified in order to convert it to a viscous fluid concentrate which will readily solidify when the concentrate is extruded and drawn in air to form fibers. The concentration step can be carried out by techniques known in the art, see e.g., U.S. Pat. No. 3,795,524 (the disclosure of which is incorporated herein by reference). Sufficient concentration will be obtained when the equivalent oxide solids content is generally in the range of 20 to 40, typically less than 35 weight percent, and viscosities (Brookfield at ambient room temperature) are in the range of 15,000 to 1,000,000 centipoise, preferably 45,000 to 600,000 centipoise, depending on the type of fiberizing dehydrative solidifying (or solution immobilization) technique and apparatus used and the desired shape of the green (uncalcined) fiber. High viscosities tend to result in fibers which are circular in cross-section whereas low viscosities (e.g., less than 50,000 centipoise) tend to result in fibers which are oval in cross-section.

In making continuous fibers, the viscous concentrate can be extruded through a plurality of orifices (e.g., up to 400 or more) from a stationary head and the resulting green fibers allowed to fall in air by the force of gravity or drawn mechanically in air by means of drawing rolls or a drum or winding devices rotating at a speed faster than the rate of extrusion. The concentrate can also be extruded through orifices from a stationary or rotating head and blown by parallel, oblique or tangential streams of air such as in the making of cotton candy. The resulting blown green fibers being in staple form or short form with lengths generally 25 cm or less (rather than in long or continuous form) and collected on a screen or the like in the form of a mat. Any of these forces exerted on the extruded green fibers, e.g., gravity, drawing, or air streams, cause attenuation or stretching of the fibers, reducing their diameter by about 50 to 90 percent or more and increasing their length by about 300 to 10,000 percent or more and serving to hasten or aid the drying of the green fibers.

The dehydrative solidifying of the green fibers can be carried out in ambient air or heated air can be used if desirable or necessary to obtain fast drying. The drying rate assists in controlling of the shape of the fiber. The relative humidity of such air should be controlled since large amounts of moisture will cause the solidified or shaped green fibers to stick together and excessively dry atmosphere can lead to fiber breakage. Generally, air with relative humidity in the range of 20 to 60 percent can be used at temperatures of 15° to 30° C., though such air can be heated subsequently to about 70° C. or higher. In some cases, for example, where continuous green fibers are made and gathered together in parallel alignment or juxtaposition in the form of a multi-fiber strand, the fibers or strand can be treated with a size to prevent the fibers from sticking together.

The process steps for preparing fibers are more fully described in European Patent Application No. 294208, published Dec. 7, 1988, the disclosure of which is incorporated herein by reference. The process steps for preparing other preferred embodiments (i.e., a bead, a microsphere, a flake, an irregularly shaped particle, a film, or a microcapsule are described in the same European Patent Application.

The dried solution may be calcined and sintered as described above in the preferred dispersion-based sol-gel process except the preferred calcination atmosphere is dependent on the alpha alumina precursor used. If the alpha alumina precursor is a basic aluminum carboxylate, the preferred calcining atmosphere is related to the carbon content of the precursor.

For a basic aluminum carboxylate having a relatively high carbon content (typically greater than about 15 to 20 weight percent), the preferred calcining atmosphere comprises air or a mixture of air and an inert gas.

For a basic aluminum carboxylate having a relative low carbon content (typically less than about 10 to 15 weight percent), the calcining atmosphere preferably comprises an inert gas. More preferably, the calcining atmosphere comprises a mixture of an inert gas and a reducing gas. Most preferably, the calcining atmosphere comprises a reducing gas.

If the alpha alumina precursor is a basic aluminum nitrate, the preferred calcining atmosphere comprises an inert gas. More preferably, the calcining atmosphere comprises a mixture of an inert gas and a reducing gas. Most preferably, the calcining atmosphere comprises a reducing gas.

Other steps can be included in this process, such as rapidly heating the material from the calcining temperature to the sintering temperature, sizing granular material, centrifuging the dispersion to remove sludge waste, etc. Moreover, this process can be modified by combining two or more of the individually described steps, if desired.

The alpha alumina-based ceramic of the present invention may consist essentially of alpha alumina having the chromium-based nucleating material dispersed therein.

Preferably, the total amount of alumina and chromium oxide present in the alpha alumina-based ceramic of the present invention is at least 60 weight percent, based on the total ceramic composition. More preferably, the amount of alumina and chromium oxide present is at least 80 weight percent of the ceramic composition, and even more preferably alumina and chromium oxide comprise at least 90 weight percent.

The improved ceramic may be substantially void free or it may be characterized by including porosity. Typically equaxial pores which are for the most part on the interior of the ceramic with a minor part of the pores extending to the surface. Preferably, however, the porosity is closed.

Preferably, the improved ceramic has a hardness greater than 18 GPa. More preferably, the hardness is greater than 20 GPa, even more preferably greater than 24 GPa, and most preferably, greater than 25 GPa.

The ceramic material of the present invention may be used in areas where conventional ceramics are used and particularly where a more durable ceramic is needed. Particularly useful embodiments include articles in the shape of an abrasive grain, a fiber, a bead, a microsphere, a flake, an irregularly shaped particle, a film, or a microcapsule.

An abrasive grain according to the present invention may be used in conventional abrasive products. Preferred abrasive products are coated abrasives, bonded abrasives, such as abrasive grinding wheels or cut-off wheels, and low density, three-dimensional nonwoven abrasives.

In a preferred embodiment the abrasive grains according to the present invention is blended with less expensive conventional mineral such as fused aluminum oxide, silicon carbide, garnet, fused alumina-zirconia, and the like.

The methods of making such abrasive products are well-known to those skilled in the art. A coated abrasive product includes a backing, for example, formed of fabric (e.g., woven or non-woven fabric such as paper) which may be saturated with a filled binder material, a polymer film such as that formed of oriented heat-set polypropylene or polyethylene terephthalate which may be first primed, if needed, with a priming material, or any other conventional backing material. The coated abrasive also includes a binder material, typically in layers including a make or maker coat, a size or sizing coat and possibly a supersize coat. Conventional binder materials include phenolic resins.

Low-density, three-dimensional, non-woven abrasive products typically include an open porous lofty polymer filament structure having the ceramic abrasive grain distributed throughout the structure and adherently bonded therein by an adhesive material.

Bonded abrasive products typically consist of a shaped mass of abrasive grain held together by an organic or ceramic binder material. The shaped mass is preferably in the form of a grinding wheel. The preferred binder materials for the ceramic abrasive grain of the invention are organic binders. Ceramic or vitrified binders may be used if they are curable at temperatures and under conditions which will not adversely affect the ceramic abrasive grain of the present invention.

A preferred embodiment of the present invention is a fiber containing less than 0.1 weight percent iron equivalence, based on the total alpha alumina content of the fiber. More preferably, the fiber contains less than 0.05 weight percent iron equivalence, based on the total alpha alumina content of the fiber.

This invention is further illustrated by the following examples, but the particular materials and amounts thereof recited in these examples, as well as other conditions and details, should not be construed to unduly limit this invention. All parts and percentages are by weight unless otherwise indicated.

EXAMPLES

Control A

Example Control A, which has a non-seeded microstructure, illustrates an alpha alumina-based ceramic prepared without the inventive alpha alumina nucleating material of the present invention.

A 1 liter "Waring" type blender (Waring Products Div., Dynamics Corp. of America; New Hartford, Conn.) was charged with 420 grams of deionized water. While rapidly stirring, 168.5 grams of boehmite (commercially available under the trade designations "DISPERAL" from Condea Chimie; Hamburg, West Germany) were added followed by 5.6 ml of 16 N $HNO_3$. An ammonium acetate solution was prepared by dissolving 2.2 grams of ammonium acetate in 10 grams of deionized water. To induce gelation, the ammonium acetate solution was added to the boehmite dispersion, while rapidly stirring.

The dispersion was transferred to a shallow aluminum tray and allowed to gel. The gel was dried overnight in a conventional forced air convection oven at 95° C.

The dried gel was calcined in a tube furnace with a flowing 95% $N_2$/5% $H_2$ atmosphere by heating to 650° C. at a rate of about 3.5° C./minute. The calcined gel was sintered in a conventional box furnace (Rapid Temp; CM, Inc., Bloomingfield, N.J.) in air for 5 minutes at a temperature of 1400° C. The sintered ceramic was white.

Several pieces of the sintered ceramic were crushed using a tungsten carbide mortar and pestle. Optical microscopy of the crushed ceramic at a magnification of 500×, using cross-polarized light, indicated domains having a diameter in the range of 5 to 12 micrometers. The average diameter of the domains was 6 to 8 micrometers.

SEM (scanning electron microscopy) examination of a fracture surface of the sintered ceramic revealed a porous, vermicular microstructure with non-faceted domains. The density of the ceramic was estimated to be less than 80 percent of theoretical.

Control B

Example Control B illustrates that the mere addition of a chromium-based material does not necessarily produce an alpha alumina-based ceramic having a seeded or well-seeded microstructure, nor does its presence necessarily have a significant effect on the microstructure of an alpha alumina-based ceramic.

Control B was prepared in the same manner as Control A except 17.6 grams of basic chromium acetate $(Cr_3(OH)_2(CH_3CO_2))_7$; Matheson Coleman Bell Manufacturing Chemists; Norwood, Ohio) was added to the dispersion prior to the addition of the nitric acid. The color of the sintered ceramic, which was not homogenous, was pink-purple with some small green regions.

The sintered ceramic was examined with an optical microscope and an SEM as described in Control A. The microstructure of the Control B ceramic was similar to the microstructure of the Control A ceramic.

EXAMPLE 1

Example 1 illustrates the use of $CrO_2$ to produce a boehmite-derived alpha alumina-based ceramic having a well-seeded microstructure.

A 4 liter "Waring" industrial type blender was charged with 850 grams of deionized water. While stirring at high speed, 336.9 grams of boehmite were added followed by 11 ml of 16N $HNO_3$ and 14.7 grams of $CrO_2$ powder (having an average primary dimension of about 0.3 micrometer; commercially available under the trade designation DUPONT D-500-02 from E. I. DuPont de Nemours & Co.; Wilmington, Del.). An ammonium acetate solution was prepared by dissolving 4.6 grams of ammonium acetate in 10 grams of deionized water. To induce gelation, the ammonium acetate solution was added to the boehmite dispersion, while rapidly stirring.

The gel was transferred to a shallow aluminum tray and allowed to dry in air for 3 days. The gel was then dried in a forced air convection oven overnight at 90° C. The dried gel was calcined and sintered as described in Control A. The calcined material was green. The sintered material was a deep pink-purple.

SEM examination, as described in Control A, revealed a dense microstructure (i.e., greater than about 95 percent of theoretical density) comprising domains having an average diameter of less than about 0.8 micrometer. The size of the pores, which were present at triple point junctions of the faceted domains, were less than about 0.2 micrometer.

COMPARATIVE I

Comparative I, which has the same $Cr_2O_3$ equivalent as the ceramic of Example 1, illustrates the superior seeding capability of a $CrO_2$ nucleating material added to the boehmite sol over the addition of comparatively sized $Cr_2O_3$ particles.

Comparative I was prepared in the same manner as Example 1 except 13.3 grams of alpha chromia powder (having an average primary dimension of about 0.3 micrometer; Grade GR-99; CMC Cometals, Inc; New York, N.Y.) was added to the dispersion in place of the $CrO_2$ powder.

SEM examination, as described in Control A, revealed porous vermicular domains and a microstructure which was about 80 to 85 percent of theoretical density. Few well-defined faceted domains were present.

Although the ceramic of this example had the same composition as the ceramic of Example 1, the Comparative I ceramic was significantly lighter in color than the Example 1 ceramic. It is believed that the difference in color is due to the difference in density, wherein the higher the density (i.e., less porous), the darker the color.

COMPARATIVE II

Comparative II further illustrates the superior seeding capability of a $CrO_2$ nucleating material added to the boehmite sol over the addition of $Cr_2O_3$ particles.

Comparative II was prepared in the same manner as Example 1, except the "Waring" type blender was charged with 650 grams of deionized water rather than 850 grams, 204 grams of an alpha chromia sol (prepared as described below) was substituted for the $CrO_2$ powder, and a solution of 6 grams of ammonium acetate dissolved in 15 grams of deionized water was added to induce gelation.

The alpha chromia sol was prepared by charging a "Waring" type blender with 500 grams of deionized water and 100 grams of alpha chromia (Grade GR-99; CMC Cometals, Inc.). While stirring rapidly, 1.75 ml of a dispersing aid (commercially available under the trade designation CORCAT P-600 polyethyleneimine from Virginia Chemicals; Portsmith, Va.) were added to the alpha chromia dispersion. The alpha chromium dispersion was allowed to stand undisturbed for 2 days. The supernatant was separated by decantation. The concentration of alpha chromia present in the supernatant, as determined by calcination was about 1.6 percent.

SEM examination, as described in Control A, revealed a microstructure similar to the ceramic of Comparative I except the density was about 85 to 90% of theoretical.

COMPARATIVE III

In Comparative III, the particle size of a $Cr_2O_3$ nucleating agent was reduced by ball milling. The $Cr_2O_3$ nucleating material having the reduced particle size was used in preparing a boehmite-derived alumina-based ceramic which was poorly seeded (i.e., approaching a seeded microstructure).

A 2-liter, rubber-lined mill jar was charged with 4600 grams of zirconia mill media (1.3 cm(½ inch) diameter cylinders; Stoneware Corp.; Mahwah, N.J.), 1 liter of deionized water, 300 grams of chromium oxide (having an average particle size of about 0.6 to 0.8 micrometer; Chrome Oxide 112; American Chrome and Chemical Inc.; Corpus Christi, Tex.), and 100 ml of 16N hydrochloric acid. The jar was rotated at 70 rpm for 72 hours.

The resulting slurry was centrifuged at 5000 rpm for 40 minutes. The supernatant was removed by decantation. The centrifuged solid was redispersed in 400 ml of deionized water and then allowed to stand undisturbed for about 4 weeks at a temperature of about 25° C. The solid material which had settled was redispersed by stirring and by the application of sonic energy provided by a Fisher Sonic Dismembrator (Model 300; Fisher Scientific; Pittsburgh, Pa.), wherein the sonic dismembrator was set to provide intermediate tip at 60% power for 4 minutes. The dispersion was then allowed to stand undisturbed for about 12 hours. The resulting supernatant was removed by decantation. The concentration of chromium oxide present in the supernatant was determined by calcination to be about 7 percent.

Two hundred grams of the supernatant containing 7 percent chromium oxide was allowed to stand undisturbed for about 1 week. The resulting supernatant was removed by decantation and determined by calcination to contain about 0.54 percent chromium oxide.

A "Waring" type blender was charged with 20 grams of the 0.54 percent chromium oxide sol described above. While rapidly stirring, 5 grams of deionized water, 7 grams of boehmite and 0.3 ml of 16N $HNO_3$ were added to the supernatant containing 0.54 percent chromium oxide. Three drops of a 1 molar ammonium acetate solution were then added to the dispersion, while stirring, to induce gelation. The dispersion gelled within about 5 minutes. The gel was transferred to a porcelain dish and dried in a forced air convection oven for 4 hours at a temperature of 95° C. The dried gel was calcined as described in Example 1. The calcined material was green. The calcined gel was sintered as described in Example 1.

Optical microscopy examination, as described in Control A, indicated domains having a diameter of less than about 2 micrometers.

SEM examination, as described in Control A, revealed domains having a diameter of less than about 2 micrometers, wherein regions of the ceramic had greater than about 80 to 85% of theoretical density as well as porous regions having a vermicular microstructure. The ceramic exhibited both trans- and intra-granular fracture.

EXAMPLE 2

Example 2 illustrates the use of a $Cr_2O_3$ nucleating material to produce boehmite-derived alpha alumina ceramic having a seeded microstructure by using glacial acetic acid as a dispersing aid rather than nitric acid.

A "Waring" type blender was charged with 275 grams of deionized water. While stirring rapidly, the following were added in sequence: 156.2 grams of boehmite, 10 ml of glacial acetic acid, 50 grams of the supernatant described in Example 4 (containing 7 percent chromium oxide) and 1 ml of a 2 molar ammonium acetate solution.

The resulting gel was transferred to aluminum trays and dried in a forced air convection oven for 72 hours at a temperature of 75° C. About 10 grams of the dried gel was calcined in a tube furnace with flowing 95%Ar/5% $H_2$ atmosphere by heating to 550° C. at a rate of about 4.4° C./minute. The calcined material was green. The calcined material was sintered as described in Example 1.

Optical microscopy examination, as described in Control A, revealed domains having an average diameter of less than about 2 micrometers.

SEM examination, as described in Control A, revealed sub-micrometer domains, wherein the density of the ceramic was about 80% of theoretical. The ceramic exhibited both trans- and intra-granular fracture.

The density of the ceramic of this example was increased to about 90% of theoretical by further sintering for about 10 minutes at about 1460° C. The average diameter of the domains comprising the re-sintered ceramic was about 1 micrometer.

EXAMPLE 3

Example 3 illustrates that the alpha alumina ceramic described in Example 2 can be prepared by sintering the calcined material from Example 2 in air.

About 10 grams of the dried gel described in Example 2 were calcined in a tube furnace in air by heating the material to 600° C. at a rate of about 9.6° C./minute and then holding the material at 600° C. for 30 minutes.

The calcined material was green. The calcined material was sintered in a box furnace in air for 5 minutes at a temperature of 1400° C.

Optical microscopy examination, as described in Control A, revealed domains having a diameter of less than about 2 micrometers.

SEM Examination, as described in Control A, revealed sub-micrometer domains and a density of about 80% of theoretical. The ceramic exhibited both trans- and intra-granular fracture.

The density of the ceramic of this example increased to about 90% of theoretical by re-sintering at 1460° C. for 10 minutes. The average diameter of the domains comprising the re-sintered ceramic was about 1 micrometer.

EXAMPLE 4

Example 4 illustrates the use of a $Cr_2O_3$ nucleating material to produce a solution-derived alpha alumina-based ceramic having a well-seeded microstructure.

A basic aluminum carboxylate solution was prepared according to the procedure described in Example 1 of U.S. Pat. No. 4,798,814 (the disclosure of which is incorporated herein by reference), except the ratio of total carboxylic acid to aluminum ratio was about 1:1 and the amount of aluminum present was about 9 percent.

Twenty grams of a dispersion containing 7 percent chromium oxide, prepared as described in Comparative III, was added to 25 grams of the basic aluminum carboxylate solution described above, while stirring. The mixture was autoclaved at 235° C. for 1 hour. The mixture was cooled and then centrifuged at a speed of 5000 rpm for 10 minutes. The turbid supernatant sol was dried at 95° C. The resulting solid was calcined in a tube furnace with a flowing $N_2$ atmosphere by heating it to 600° C. at a rate of about 4.8° C./ minute. The calcined material was green. The calcined gel was sintered as described in Example 1. The sintered ceramic was pink.

SEM examination, as described in Control A, revealed an extremely uniform microstructure wherein most of the domains had a diameter in the range of about 0.2 to 0.4 micrometer. The largest domain observed had a diameter of less than about 0.5 micrometer. The density of the ceramic was greater than about 99% of theoretical.

EXAMPLE 5

Example 5 further illustrates the use of a $CrO_2$ nucleating material to produce a boehmite-derived alpha alumina ceramic having a seeded microstructure.

A "Waring" type blender was charged with 850 grams of deionized water. While rapidly stirring, the following were added in sequence: 336.9 grams of boehmite, 14.7 grams of $CrO_2$ powder (commercially available under the trade designation "DUPONT" D-500-02), and 11 ml of 16N nitric acid. A 2 molar ammonium acetate solution was added dropwise, while rapidly stirring, until gelation occured.

The gel was transferred to a thick walled filter flask and degassed in a vacuum. The degassed gel was dried at 75° C. in a forced air convection oven for 72 hours. The dried gel was calcined in a tube furnace as described in Example 1. The color of the calcined material was green. Ten grams of the calcined gel were sintered as described in Example 1.

Optical examination, as described in Control A, indicated domains having a diameter of less than about 1 micrometer.

SEM examination, as described in Control A, revealed a microstructure comprising domains having an average diameter of about 0.4 to 0.9 micrometer, wherein the median diameter was about 0.7 to 0.9 micrometer. The density of the ceramic was observed to be about 90 to 95 percent of theoretical.

EXAMPLE 6

Example 6 demonstrates the use of the ceramic according to Example 5 as an abrasive grain.

Abrasive grain were prepared using the process described in Example 5, except the size of the batch was increased by a factor of four, the dried gel was crushed with a roll crusher (Laboratory Model; Allis Chalmers;

Milwaukee, Wis.) and then screened to about −20+54 mesh (about 295 to about 833 micrometers) using U.S. Standard Screens. The screened material was calcined as described in Example 1 except the atmosphere was 95% Ar/5%$H_2$. The color of the calcined material was green.

The abrasive grain were used to make 17.75 cm (7-inch) diameter coated abrasive discs having a 2.2 cm ($\frac{7}{8}$ inch) centerhole. The abrasive grain for each disc consisted of a 1:1 by weight mixture of −30+35 mesh (average diameter of about 550 micrometers) and −35+40 mesh (average diameter of about 460 micrometers) screen cuts obtained using U.S. Standard Screens.

The discs were prepared using conventional coated abrasive making procedures, conventional 0.76 mm vulcanized fiber backings and conventional calcium carbonate-filled phenolic make and size resins, without adjusting for mineral density differences. The make resin was precured for 75 minutes at 88° C. The size resin was precured for 90 minutes at 88° C. followed by a final cure of 100° C. for 10 hours. Conventional one-trip coating techniques and curing in a forced air oven were employed. The coating weights (wet basis) were as follows:

| Coating | Coating Weight (g/cm$^2$) |
| --- | --- |
| make | 0.017 |
| size | 0.052 |
| mineral | 0.073 |

The resultant cured discs were first conventionally flexed to controllably crack the hard bonding resins, mounted on a beveled aluminum back-up pad, and used to grind the face of 1.25 cm×18 cm 1018 cold rolled steel workpiece. The disc was driven at 5000 rpm while the portion of the disc overlying the beveled edge of the back-up pad contacted the workpice at a pressure of 0.91 kg/cm$^2$, generated a disc wear path of about 140 cm$^2$. Each disc was used to grind 12 separate workpieces for 1 minute each.

Three discs were prepared and tested according to the procedures described above, except the abrasive material was brown fused alumina. Using the average cumulative cut of 3 discs made with brown fused alumina abrasive grain as 100%, the average relative cumulative cut of the 12 cuts for 3 discs having the abrasive grain of Example 6 was 239%.

Three discs were prepared and tested according to the procedures described above, except the abrasive material was abrasive grain as taught by Schwabel in U.S. Pat. No. 4,744,802 (commercially available under the trade designation CUBITRON from 3M; St. Paul, Minn.), the disclosure of which is incorporated herein by reference. Using the average cumulative cut of 3 discs made using "CUBITRON" abrasive grain as 100%, the average relative cumulative cut of the 12 cuts for 3 discs having the abrasive grain of Example 6 was 94%.

EXAMPLE 7

Example 7 demonstrates the superior grinding performance of the abrasive grain according to Example 6 when sintered in a 95% $N_2$/5%$H_2$ atmosphere rather than in air.

Abrasive grain were prepared in the same manner as described in Example 6, except the calcined gel was sintered in a 95%$N_2$/5% $H_2$ atmosphere.

Coated abrasive discs having the abrasive grain of this example were prepared and tested as described in Example 6. The average relative cumulative cuts of the coated abrasive discs having the abrasive grain of Example 7 was 102% of discs having "CUBITRON" abrasive grain.

The hardness of seven Example 7 abrasive particles were determined by a standard Knoop indentation technique (Leitz Miniload 2; Ernst Leitz Wetzlar GMBH; West Germany) where the applied load was 500 grams. The average hardness of 5 indents per particle ranged from 23 to 26 GPa.

EXAMPLE 8

Example 8 illustrate the use of a $CrO_2$ nucleating material to produce a solution-derived alpha alumina-based ceramic comprising domains having an average diameter of less than 1.0 micrometer.

A 2 liter, rubber lined ball mill was charged with 4600 grams of zirconia mill media (U.S. Stone Corp.; Mahwah, N.J.), 600 grams of a basic aluminum carboxylate solution (prepared as described in Example 4), and 75 grams of $CrO_2$ powder (commercially available under the trade designation "DUPONT" D-500-02). The jar was milled at 70 rpm for 24 hours.

Ten grams of the slurry were removed from the mill jar and diluted with 50 grams of the basic aluminum carboxylate solution described above, while stirring. The resulting dispersion was allowed to stand undisturbed for 72 hours. The clear supernatant was removed, dried in a convection oven at 85° C. for 12 hours, and calcined in air by heating to 650° C. at a rate of about 10.4° C./minute. The calcined material was sintered as described in Example 1. The sintered ceramic was a very light pink.

Optical examination, as described in Control A, revealed a microstructure having a clear almost glass-like appearance, wherein the average diameter of the domains was less than about 1 micrometer.

The slurry remaining in the mill jar was milled for an additional 48 hours. The slurry was removed and allowed to stand undisturbed for 12 hours. The clear supernatant was removed by decantation.

About 119.5 grams of the supernatant dispersion just described was added to 4.9 grams of a 88% lactic acid, while stirring. The mixture was filtered through a fine filter paper (Whatman No. 5; W&K Balston; England). The filtered liquid was concentrated to about 24 percent solids, based on the equivalent oxide, by roto-evaporation (commercially available under the trade designation "ROTOVAPOR" flask from Buchi/Brinkmann Rotary Evaporators; Westbury, N.J.). Fibers were formed by extruding this concentrate through a spinnerette having 40 to 76 micrometer diameter holes. The fibers were drawn down, while partially drying in air having 35% relative humidity, and collected onto a rotating 58.4 cm (23 inch) diameter wheel. The fibers were calcined in air by heating to 650° C. at a rate of about 10.4° C./minute. The calcined fibers were green in color.

The calcined fibers were sintered in a conventional box furnace in air for 5 minutes at 1400° C. The diameter of the sintered fibers was about 10 to 40 micrometers.

SEM examination of a fiber surface indicated the average surface roughness height was less than about 0.100 micrometer. SEM examination of a fiber, as described in Control A, revealed a microstructure having a uniform distribution of 0.15 to 0.3 micrometer diameter domains and a density of about 95 to about 100% of theoretical.

EXAMPLE 9

Example 9 illustrates the use of a chromium-based nucleating material prepared by hydrolyzing a chromium salt in the presence of a reducing material to produce a boehmite-derived alpha alumina-based ceramic having a well-seeded microstructure.

A 3-necked, 1000 ml round bottom flask was fitted with a reflux condenser and a rubber septum, and then connected to an oil filled gas bubbler. The flask was charged with 79.9 grams of $CrCl_3.6H_2O$ (J. T. Baker Chemical Co.; Phillipsburg, N.J.) and 500 ml of deionized water. While stirring, the solution was deaerated by vigorously bubbling nitrogen gas through the solution for about 30 minutes. About 2.7 grams of aluminum powder (Fisher Scientific Co.; Fair Lawn, N.J.) was introduced into the solution under a positive pressure of nitrogen gas. The mixture was gently heated with a heating mantle for 30 minutes. The mixture was then refluxed for 30 minutes. About 1 gram of chromium powder (Lunex Co.; Davenport, Iowa) was then added to the mixture. The mixture was refluxed for 16 additional hours and then cooled. The mixture was centrifuged at 5000 rpm for 50 minutes. The supernatant was decanted and the solid residue redispersed in 250 ml of deionized water by stirring and by the application of sonic energy for 90 seconds. Gravimetric evaluation of the resulting dispersion, as described in Example 4, determined it contained 3 percent chromium oxide.

A "Waring" type blender was charged with about 154.6 grams of the dispersion just described 800 grams of deionized water. While rapidly stirring, the following were then added in sequence: 200 grams of boehmite and 3 ml of 16N nitric acid. A 2 molar ammonium acetate solution was added drop-wise, while rapidly stirring, until gelation occurred. The gel was transferred to aluminum trays and dried at 95° C. in a forced air convection oven for 12 hours. The dried gel was calcined as described in Example 1. The calcined material was green. The calcined material was sintered as described in Example 1.

SEM examination, as described in Control A, revealed a microstructure comprising domains having an average diameter in the range of about 0.7 to 1 micrometer. The density of the ceramic was about 95 to 99 percent of theoretical.

EXAMPLE 10

Example 10 illustrates the use of a chromium-based nucleating material prepared by hydrolyzing a chromium salt in the presence of a reducing material to produce a solution-derived alpha alumina-based ceramic having a seeded microstructure.

A 3-neck, 250 ml round bottom flask was fitted with a rubber septum through which gas could be introduced with a needle, a pressure release valve, and a reflux condenser attached to an oil bubbler. The flask was charged with 20 grams of $CrCl_3.6H_2O$ and 50 ml of deionized water. While stirring, the solution was deaereated by passing $N_2$ through the solution for about 0.5 hour. Under a positive pressure of $N_2$ gas, 1.7 grams of aluminum powder were introduced into the solution. The mixture was gently heated, as described in Example 13, for about 20 minutes. The mixture was refluxed for about 1 hour and allowed to cool Seven millimeters of the cooled mixture was extracted by syringe and transferred to a small autoclave. The mixture was autoclaved for about 3 hours at 250° C. The resulting dispersion was analyzed using conventional X-ray diffraction techniques wherein the crystalline phases identified were boehmite and $HCrO_2$. About 3 grams of the dispersion was centrifuged at 5000 rpm for 15 minutes. The supernatant was removed by decantation and discarded. The residue was dispersed in 5 grams of deionized water. About 1.5 grams of this dispersion was added to 50 grams of a basic aluminum carboxylate solution, (prepared as described in Example 8), while stirring.

The resulting sol was dried in a forced air convection oven for 4 hours at 85° C. The dried material was calcined in air for 1 hour at 500° C. The color of the calcined material was green. The calcined material was sintered in a box furnace for 1 to 2 minutes at 1400° C. in air. The sintered ceramic was pink.

SEM examination, as described in Control A, revealed a microstructure having a bi-modal distribution comprised of faceted domains having diameters in the 0.2 to 0.4 micrometer range and spherical domains having diameters in the 0.05 to 0.1 micrometer range. The density of the ceramic was about 90 to 95 percent of theoretical.

EXAMPLE 11

Example 11 illustrates the use of a chromium-based nucleating material prepared by autoclaving a chromium salt to produce a boehmite-derived alpha alumina-based ceramic having a well-seeded microstructure.

A "Waring" type blender was charged with 100 ml of deionized water, 12 grams of $Cr(NO_3)_3.9H_2O$, and 4.1 grams of boehmite. The contents of the blender were stirred rapidly for about 5 minutes. About 7 ml of this dispersion was placed in a small autoclave and heated for 1 hour at 220° C. The resulting pink-purple sol, 35 ml of deionized water, and 8.2 grams of boehmite were placed in a "Waring" type blender and stirred rapidly for 2 minutes, during which time gelation occurred. The gel was transferred to a glass tray and dried in a forced air convection oven for 120 minutes at 95° C. The dried gel was calcined in a tube furnace with a flowing 95%Ar/5% $H_2$ atmosphere by heating to 600° C. in 2.5 hours, and then holding the material at 600° C. for 20 minutes. The calcined material was sintered in a box furnace for 10 minutes in air at 1400° C.

SEM examination, as described in Control A, revealed domains having an average diameter of about 0.4 micrometer, wherein the maximum domain diameter observed was less than about 0.5 micrometer. The density of the ceramic was about 95 to 99 percent of theoretical.

Microstructural data for each Example is summarized in Table 1, below.

TABLE 1

| Example No. | Nucleating material | Alumina precursor | Calcining temperature, °C. | Calcining atmosphere | Sintering temperature, °C. | Sintering atmosphere | Average diameter of alpha alumina domains, micrometers | Percent theoretical density, % |
|---|---|---|---|---|---|---|---|---|
| Example 1 | $CrO_2$ | boehmite | 650 | 95% $N_2$/5% $H_2$ | 1400 | air | <0.8 | >95 |
| Comparative I | $Cr_2O_3$ | boehmite | 650 | 95% $N_2$/5% $H_2$ | 1400 | air | — | 80–85 |
| Comparative II | $Cr_2O_3$ | boehmite | 650 | 95% $N_2$/5% $H_2$ | 1400 | air | — | 85–90 |
| Comparative III | $Cr_2O_3$ | boehmite | 650 | 95% $N_2$/5% $H_2$ | 1400 | air | <2.0 | 80–85 |
| Example 2 | $Cr_2O_3$ | boehmite | 550 | 95% Ar/5% $H_2$ | 1460 | air | 1.0 | 90 |
| Example 3 | $Cr_2O_3$ | boehmite | 600 | air | 1460 | air | 1.0 | 90 |
| Example 4 | $Cr_2O_3$ | basic aluminum carboxylate | 600 | $N_2$ | 1400 | air | 0.2–0.4 | >99 |
| Example 5 | $CrO_2$ | boehmite | 650 | 95% $N_2$/5% $H_2$ | 1400 | air | 0.7–0.9 | 90–95 |
| Example 6 | $CrO_2$ | boehmite | 650 | 95% $N_2$/5% $H_2$ | 1400 | air | — | — |
| Example 7 | $CrO_2$ | boehmite | 650 | 95% $N_2$/5% $H_2$ | 1400 | 95% $N_2$/5% $H_2$ | — | — |
| Example 8 | $CrO_2$ | basic aluminum carboxylate | 650 | air | 1400 | air | 0.15–0.3 | 95–100 |
| Example 9 | $HCrO_2$ | boehmite | 650 | 95% $N_2$/5% $H_2$ | 1400 | air | 0.7–1.0 | 95–99 |
| Example 10 | $HCrO_2$ | basic aluminum carboxylate | 500 | air | 1400 | air | 0.05–0.10, 0.2–0.4 | 90–95 |
| Example 11 | * | boehmite | 600 | 95% Ar/5% $H_2$ | 1400 | air | 0.4 | 95–99 |
| Control A | — | boehmite | 650 | 95% $N_2$/5% $H_2$ | 1400 | air | 6–8 | <80 |
| Control B | chromium acetate | boehmite | 650 | 95% $N_2$/5% $H_2$ | 1400 | air | 6–8 | <80 |

*$Cr(NO_3)_3.9H_2O$ which has been autoclaved for 1 hour at 220° C.

Various modifications and alterations of this invention will become apparent to those skilled in the art without departing from the scope and spirit of this invention, and it should be understood that this invention is not to be unduly limited to the illustrative embodiments set forth herein.

I claim:

1. Alpha alumina-based ceramic having a seeded microstructure comprising alpha alumina domains nucleated with alpha chromic oxide.

2. The alpha alumina-based ceramic according to claim 1, said ceramic having a well-seeded microstructure.

3. The alpha alumina-based ceramic according to claim 1 also including a modifying additive.

4. The alpha alumina-based ceramic according to claim 2 wherein said modifying additive is a metal-containing compound.

5. The alpha alumina-based ceramic according to claim 1 consisting essentially of said alpha alumina and chromium oxide nucleating material dispersed therein.

6. The alpha alumina-based ceramic according to claim 1 having a content of chromium derived from said alpha chromic oxide of about 0.085 to about 7 weight percent, based on the amount of alumina present.

7. The alpha alumina-based ceramic according to claim 1 having a content of chromium derived from said alpha chromic oxide of about 0.3 to about 3.5 weight percent, based on the amount of alpha alumina present.

8. The alpha alumina-based ceramic according to claim 1 wherein the total amount of alumina plus chromia is at least 60 weight percent, based on the total ceramic composition.

9. The alpha alumina-based ceramic according to claim 1 wherein the total amount of alumina plus chromia is at least 90 weight percent, based on the total ceramic composition.

10. Abrasive grain comprising the ceramic of claim 1.

11. An abrasive article comprising abrasive grain at least a portion of which comprises said abrasive grain according to claim 10.

12. The abrasive article according to claim 11 in the form of a coated abrasive product.

13. The abrasive article according to claim 11 in the form of a bonded abrasive product.

14. The bonded abrasive article according to claim 13 in the form of a bonded abrasive wheel.

15. The abrasive article according to claim 11 in the form of a low density, three-dimensional non-woven abrasive product.

16. A fiber comprising the ceramic of claim 1.

17. The fiber according to claim 16 having less than 0.1 weight percent iron equivalent, based on the total alpha alumina content of said ceramic.

18. The fiber according to claim 16 having less than 0.05 weight percent iron equivalent, based on the total alpha alumina content of said ceramic.

19. The fiber according to claim 16 having an average surface roughness height less than 0.100 micrometer.

20. The alpha alumina-based ceramic according to claim 1 wherein said ceramic is a shape selected from a fiber, a bead, a microsphere, a flake, an irregularly shaped particle, a film, or a microcapsule.

21. A method of making an alpha alumina-based ceramic, said method comprising the steps of:
    a) preparing an aqueous mixture comprising:
        i) an alpha alumina precursor; and
        ii) a sufficient amount to nucleate during the following process steps said alpha alumina precursor to alpha alumina having a seeded microstructure of at least one chromium compound selected from the group consisting of an alpha chromic oxide precursor, alpha chromic oxide, and mixtures thereof;
    b) immobilizing said aqueous mixture;

c) drying said immobilized aqueous mixture to produce a dry body;

d) calcining said body at a temperature and in an atmosphere sufficient to provide substantially all the chromium derived from said chromium compound within said body in an oxidation state of not greater than +3; and e) sintering said calcined body at a temperature and in an atmosphere sufficient to provide alpha alumina-based ceramic having a seeded microstructure.

22. The method according to claim 21 wherein said chromium compound particles of step (a) have an average particle size of less than 0.5 micrometers in the primary dimension.

23. The method according to claim 22, said alpha alumina-based ceramic having a well-seeded microstructure.

24. The method according to claim 22 wherein said aqueous mixture is a dispersion and said immobilizing is by gelling said dispersion.

25. The method according to claim 22 wherein said aqueous mixture is a solution and said immobilizing is by rigidifying said solution.

26. The method according to claim 22 wherein at least one of said calcining atmosphere or sintering atmosphere comprises air.

27. The method according to claim 22 wherein at least one of said calcining atmosphere or sintering atmosphere comprises a mixture of air and an inert gas.

28. The method according to claim 22 wherein at least one of said calcining atmosphere or sintering atmosphere comprises an inert gas.

29. The method according to claim 22 wherein at least one of said calcining atmosphere or sintering atmosphere comprises a mixture of an inert gas and a reducing gas.

30. The method according to claim 22 wherein at least one of said calcining atmosphere or sintering atmosphere comprises a reducing gas.

31. The method according to claim 22 wherein said alpha chromic oxide precursor is a compound selected from the group consisting of $CrO_2$, $HCrO_2$, and a mixture thereof.

32. The method according to claim 24 wherein said alpha alumina precursor is boehmite.

33. The method according to claim 25 wherein said alpha alumina precursor is a basic aluminum carboxylate.

34. The method according to claim 25 wherein said alpha alumina precursor is a basic aluminum nitrate.

35. The method according to claim 22 wherein said dried body is crushed before calcining to produce particles.

36. The method according to claim 22 wherein said calcined body is crushed to produce particles.

37. The method according to claim 22 wherein the amount of said compound added to said aqueous mixture is sufficient to provide about 0.085 to about 7 weight percent chromium, based on the amount of alumina present in said alpha alumina-based ceramic.

38. The method according to claim 22 wherein the amount of said compound added to said aqueous mixture is sufficient to provide about 0.3 to about 3.5 weight percent chromium, based on the amount of alumina present in said alpha alumina-based ceramic.

39. The method according to claim 22 wherein said calcining temperature is in the range of about 450° to 1000° C.

40. The method according to claim 22 wherein said calcined body is sintered at a temperature in the range of about 1200° to about 1650° C.

41. The method according to claim 22 wherein said calcined body is sintered at a temperature in the range of about 1300° to about 1450° C.

42. The method according to claim 22 wherein said calcined body is sintered at a temperature in the range of about 1350° to about 1450° C.

43. The method according to claim 22 wherein said immobilized aqueous solution is formed as an abrasive grain, a fiber, a bead, a microsphere, an irregularly shaped particle, a flake, a film, or a microcapsule.

44. The method according to claim 21 wherein said chromium compound particles of step (a) has an average particle size of less than about 0.25 micrometer in the primary dimension.

45. The method according to claim 21 wherein said chromium compound particles of step (a) has an average particle size of less than about 0.1 micrometer in the primary dimension.

46. The method according to claim 21 wherein said chromium compound of step (a) is in the form of particles each having a surface and having chromium present at said surface, wherein at least some of said chromium at said surface of said particles has an oxidation state greater than +3.

47. The method according to claim 22 wherein said calcining atmosphere is reducing.

48. The method according to claim 22 wherein said sintering atmosphere of step (e) is sufficient to provide chromium in said chromium compound in an oxidation state during said sintering step of up to +3.

* * * * *

UNITED STATES PATENT AND TRADEMARK OFFICE
CERTIFICATE OF CORRECTION

PATENT NO. : 5,219,806  Page 1 of 3
DATED : June 15, 1993
INVENTOR(S) : Thomas E. Wood It is certified that error appears in the above-indentified patent and that said Letters Patent is hereby corrected as shown below:

On title page,
Under [56] U.S. PATENT DOCUMENTS, "4,657,754 Bauer" should read --4,657,754 Bauer et al.--.

Column 1, line 32, "from α-Alumina, "Jagota et al." should read --α-Alumina," Jagota et al.--.

Column 1, line 65, "conditions, he fails," should read --conditions. He fails--.

Column 1, line 68, "hardly any" should read --hardly any [effect]--.

Column 2, line 11, "which, reveals" should read --which reveals--.

Column 2, line 21, "complex" should read --complex,--.

Column 2, line 38, after "chromium" add --is--.

Column 7, line 17, "by an" should read --by any--.

UNITED STATES PATENT AND TRADEMARK OFFICE
CERTIFICATE OF CORRECTION

PATENT NO. : 5,219,806
DATED : June 15, 1993
INVENTOR(S) : Thomas E. Wood

It is certified that error appears in the above-indentified patent and that said Letters Patent is hereby corrected as shown below:

Column 7, line 20, "is used, to" should read --is used to--.

Column 9, line 18, "such as, sugars" should read --such as sugars--.

Column 10, line 28, "microcapsule are" should read --microcapsule) are--.

Column 11, lines 7-8, "Typically equaxial pores" should read --Typically, the porosity is in the form of equaxial pores--.

Column 11, line 30, "is" should read --are--.

Column 12, line 18, "Chimie" should read --Chemie--.

Column 12, line 40, "500X" should read --500x--.

Column 12, line 60, "$(Cr_3(OH)_2(CH_3CO_2))_7$" should read --$(Cr_3(OH)_2(CH_3CO_2)_7)$--.

UNITED STATES PATENT AND TRADEMARK OFFICE
CERTIFICATE OF CORRECTION

PATENT NO. : 5,219,806
DATED : June 15, 1993
INVENTOR(S) : Thomas E. Wood

It is certified that error appears in the above-indentified patent and that said Letters Patent is hereby corrected as shown below:

Column 12, line 66, "an SEM" should read --a SEM--.

Column 14, line 27, "(1.3 cm(½ inch)" should read --(1.3 cm (½ inch)--.

Column 15, line 21, "Example 4" should read --Comparative III--.

Column 17, line 38, "workpice" should read --workpiece--.

Column 18, line 15, "illustrate" should read --illustrates--.

Column 19, line 37, "described 800 grams" should read --described and 800 grams--.

Column 20, line 6, "cool Seven" should read --cool. Seven--.

Signed and Sealed this

Fourteenth Day of June, 1994

Attest:

BRUCE LEHMAN

*Attesting Officer*  *Commissioner of Patents and Trademarks*